United States Patent [19]

Kickle et al.

[11] 4,181,747

[45] Jan. 1, 1980

[54] PROCESSED VEGETABLE SEED FIBER FOR FOOD PRODUCTS

[75] Inventors: Hunter L. Kickle, Mt. Zion; William J. Ball, Jr.; Robert Von Schanefelt, both of Decatur, all of Ill.

[73] Assignee: A. E. Staley Manufacturing Company, Decatur, Ill.

[21] Appl. No.: 966,246

[22] Filed: Dec. 4, 1978

Related U.S. Application Data

[63] Continuation-in-part of Ser. No. 849,289, Nov. 7, 1977, abandoned.

[51] Int. Cl.² ............................................. A23L 1/27
[52] U.S. Cl. ................................. 426/615; 426/626; 426/634; 426/431; 426/436; 426/521
[58] Field of Search ............... 426/615, 618, 626, 629, 426/634, 658, 430, 431, 436, 463, 482, 507, 508, 521

[56] References Cited

U.S. PATENT DOCUMENTS

| 2,904,435 | 9/1959 | Kruse | 426/457 X |
|---|---|---|---|
| 3,119,805 | 1/1964 | Krueger et al. | 426/430 X |
| 3,642,494 | 2/1972 | Wagner | 426/634 |
| 3,788,861 | 1/1974 | Durst | 426/463 X |
| 3,958,016 | 5/1976 | Galle | 426/618 X |

*Primary Examiner*—Robert A. Yoncoskie
*Attorney, Agent, or Firm*—Howard J. Barnett; Charles J. Meyerson

[57] ABSTRACT

A processed vegetable seed fiber, particularly corn and soybean fiber, for use in food products is disclosed. Processing is accomplished by heating an aqueous slurry of the crude vegetable seed fiber to about 155°–180° F., and then maintaining the pH of the heated slurry in the range of about 2.5 to 5.0. The elevated temperature of the slurry is maintained for up to about 15 to 60 minutes while the slurry is agitated.

The resulting acid-pasteurized slurry is then dewatered to obtain a fiber material at about 20–30% dry solids. Fresh water is then added to the dewatered fiber material to reslurry it to about 3–4% dry solids. The reslurried fiber material is agitated at a temperature up to about 140° F. for about fifteen to thirty minutes, dewatered a second time, and then dried to about 10% moisture.

18 Claims, No Drawings

PROCESSED VEGETABLE SEED FIBER FOR FOOD PRODUCTS

This is a continuation-in-part application of Ser. No. 849,289, filed Nov. 7, 1977 now abandoned.

BACKGROUND OF THE INVENTION

There has been a recent revival of interest in the role that dietary fiber performs in human nutrition as it passes through the gastrointestinal system. Although fiber is not normally considered digestible, its importance as a bulking agent is well-recognized. Other possible benefits from regular consumption of dietary fiber have been well-publicized in recent literature, including possible reduction in susceptibility to diseases of the colon, which has been inferred from epidemiological studies of specific human groups in transplanted environments.

The demand for food products containing higher fiber content has increased as consumers recognize the potential health benefits from added dietary fiber, and that their diet has become increasingly dense and concentrated over the past several decades, with less than a desirable amount of fiber. Consumers are acutely aware of the effects of nutrition on overall health.

Soy fiber has been consumed as a portion of soy flour, soy grits and other soybean derived food products, especially in Chinese, Indonesian and Japanese foods, including "tempeh", "miso" and "thuanao". Vegetable fiber may comprise up to about 4.5% of "thua-nao" made from whole soybeans.

Traditionally, wheat bran has been included in dry breakfast cereals for many years, and a uniform, relatively low level of food fiber has been present in rye breads, cracked and whole wheat breads, and other specialty breads. However, other parts of the average diet comprise highly processed foods, so the alternative choices to the above foods have become increasingly more dense, with less fiber than is now considered necessary for good gastrointestinal function. To make up for the asserted deficiency in diety fiber, suggestions have been made to introduce larger amounts of dietary fiber into such products as high fiber cereals, baked goods including bread, pancakes, cookies, pasta and snack foods. Vegetable fiber may also be used as a fat binder in sauces, gravies, salad dressings and chili. The crude fiber content in such foods may be supplemented up to seven percent by additions of this fiber product. For further discussion, see: Harland et al., "Grandma Called It Roughage", *FDA Consumer*, July-August 1977, Superintendent of Documents, pages 18 and 19.

In view of the increasing demand for dietary fiber, coupled with the ever-increasing tendency of consumers in burgeoning urban areas to use convenience foods and refined foods, additional industrial sources for dietary fiber are now being scrutinized very closely. A major industrial source is the soy hulls which are a by-product from soybean processing. Typically, such soybean hulls have been used in animal feeds, so additional refinement or processing has not been considered necessary, except processing to make the soybean hulls more appetizing to the livestock by mixing the hulls with molasses or other feeds.

However, use of soybean fiber in foods intended for human consumption raises a more immediate quality control question. Dietary fiber must be free of coliform and Salmonella bacteria to be considered a wholesome food ingredient for human consumption. Therefore, it was necessary to develop a sure method for treating the soy fiber by-product from soybean processing to produce the pasteurized food ingredient described herein.

DESCRIPTION OF THE PRIOR ART

There are numerous processes for treating vegetable seeds, U.S. Pat. Nos. 2,585,793; 3,642,490; 3,865,956 and 4,022,919, for example, describe such processes. None of the above patents, however, describe treatment of the vegetable hull or fiber material which is separated from the other parts of the vegetable seed.

U.S. Pat. No. 2,162,729 describes treatment of soybean meal containing hulls with heat and pressure to remove beany bitter flavor. The product is used as an animal feed. The temperature employed may be as high as 200° C., and the pressure is in the range of 2000 to 3000 lbs/sq. in. U.S. Pat. No. 3,119,805 deals with the fractionation of soybean hulls into several different fractions using a polar, water-miscible organic liquid such as methanol or ethanol. One fraction comprises about 35% by weight alpha-cellulose, and another fraction includes about 40% by weight of lignin- and alpha-cellulose. After removal of silica from the alpha-cellulose, it is stated that alpha-cellulose has a number of uses, but none of these are disclosed. The process includes soaking the cellulose in solvent at 30° C. (86° F.) for up to about eight hours, but there is no disclosure of an acid pasteurization step.

SUMMARY OF THE INVENTION

This invention is directed to a method of pasteurizing vegetable fiber, particularly corn bran or, soybean fiber, derived from corn, or soybean hulls, respectively. The pasteurization is carried out at a relatively low temperature in the range of about 150° F. to 170° F. at an acid pH. An aqueous slurry (3-6% dry substance) of crude corn or soybean fiber is adjusted to a pH in the range of about 2.5 to 5.0 with an acid such as sulfuric acid. The slurry is heated to a temperature of about 160° F., and held at this temperature for about one-fourth hour to one hour with agitation to pasteurize the crude corn or soybean fiber. Acid-pasteurization in the pH range of 2.5-5.0, and at a temperature below about 180° F. maintains the fiber at the best possible color. When corn fiber (bran) is being processed, a pH above 3.5 is preferred to avoid pink to red color development. Sulfuric acid is preferred, but other food acceptable acids can be used, including hydrochloric, phosphoric, tartaric, citric, acetic, ascorbic, itaconic and fumaric acids.

The pasteurized corn bran or soybean fiber slurry is then dewatered to 20-30% dry solids, and may then be reslurried to 3-4% dry solids, or washed with fresh water, and agitated for 15-30 minutes at a temperature ranging from about 70° F. to 150° F. The treated corn bran or soybean fiber is then dewatered to about 20-30% dry solids, and is finally dried to about 10% moisture.

This invention is based in part on the discovery that vegetable seed hulls, including the hilums of soybean hulls, are color sensitive to changes in pH. When soybean hulls are slurried, and the pH adjusted from neutral into an acid range, the normally dark-colored hilums lighten from brown-black to almost colorless as the pH is decreased. After a certain observable low pH is reached, the hilums start to change from colorless to pink, and then to red, as the pH is further decreased to a more acid condition. The color condition of the hilums appears to be reversible. When the highly acid soybean hull slurry is readjusted to a higher pH, the hilums change from red to pink to almost colorless, and finally to brown-black at near neutral pH.

When the pH of soybean hulls is highly acid, that is, below about pH 2.5, not only does the pink to red color of the hilums begin to show up, but the strong acid tends to hydrolyze some of the hemicellulose of the fiber making it "slimy". The "slimly" fiber is difficult to filter because the partially hydrolyzed hemicellulose tends to clog the filter system.

At the other end of the pH range, above about pH 5, the hilums and the hulls tend to be darker (brown-black) in color, and undesirable as a food additive where the color is a consideration. The heating period must necessarily be longer, and the temperature somewhat higher, if more nearly neutral pH acid-pasteurizing is employed. If the temperature during acid-pasteurizing exceeds 180° F., some discoloring of the soybean hulls may take place, and the higher temperature may also impart some undesirable flavor to the processed hulls.

Corn bran has no hilums, and the pH responsive color changes are somewhat different, possibly because the chemical composition of the corn bran is different, but corn bran also appears to go through characteristic color changes, believed to be caused by pH responsive pigments or sensitive vegetable dyes. It has been observed that, at a pH below about 3.5, corn bran begins to show pink turning to red, and then darker as the pH is decreased further. At a pH over 5.0, the corn bran turns bright yellow. Heating appears to accentuate the color change to yellow, and a longer period of heating also accentuates the change to bright yellow.

The acid-pasteurizing method of the invention may be applied to most seed hulls, including black-eyed peas, yellow field pea, horse bean, various cereal hulls, including corn, rice, oats, wheat, barley and rye. Specific adjustments in the heat and acid levels will be necessary for specific seed hulls materials to obtain the best results. The typical product made according to the invention contains no more than about 0.2 calories per gram.

DETAILED DESCRIPTION OF THE INVENTION

The following specific examples are intended to illustrate the best mode presently contemplated for carrying out the invention. These examples are not intended to limit the scope of the claims in any way. The first example describes the method used for pasteurizing prior to the method of the subject invention.

EXAMPLE I

Soybean hulls (soy fiber) which are separated from soybeans at the beginning of the soybean milling were first steamed to adjust their moisture level to 17–19%. The hulls were next heated to 205°–210° F. with steam, and held at this elevated temperature for fifteen minutes. The steamed hulls were dried to 7–12% moisture, and the dried hulls were ground and screened through a 062 mesh round screen. The above method produced a product which was dark in color and had a toasted flavor.

EXAMPLE II

Soybean hulls were slurried with water to a moisture level of about 5–6% dry solids. The slurry was maintained at about 160°–170° F., and sulfuric acid was added to lower the pH of the slurry to about 4.0–4.5. The slurry was maintained at this pH with additional sulfuric acid for about one-half hour. The slurry was then dewatered to about 20–30% dry solids. The dewatered soybean fiber was then reslurried to about 3–6% dry solids using fresh water. The slurry temperature was adjusted to 140° F., and maintained at this temperature with agitation for about thirty minutes. The slurry was then dewatered again, and finally dried to about 10% maximum moisture, screened, and then packaged as a refined, pasteurized soy bran product. Present specifications are:

Total Bacteria Count: less than 50,000 max./g.
Total thermophiles: 150 max./10 g.
Flat sours: 75 max./10 g.
Total yeast count: 50 max./g.
Total mold count: 50 max./g.

Salmonella and coliform tests were negative. The total crude fiber was about 47% minimum d.s.b. Water holding capacity: 3.0–4.5 g./g. of product.

Fat content: 2% maximum

The product contained about 10% protein dry substance basis (d.s.b.) and 2% ash d.s.b. The flavor was bland, and the product had a good odor and light color. Metabolic tests showed the processed fiber product had a very low calorie content (0.2 cal./g.). Water holding capacity was 3.8 g./g. of product.

EXAMPLE III

This example is the same as Example II, except hydrochloric acid was used for pH adjustment instead of sulfuric acid, and the pH was in the range of 3.5 to 5.0. The resulting product met all the same microbiological specifications, but the color of Example II was slightly better than the subject example. This is believed to be due to the pH sensitivity of the hilum. The flavor was bland, and the odor was good.

EXAMPLE IV

In a variation of Example II, a 4% dry solids slurry of crude soybean hulls was prepared and heated to 160° F. Sulfuric acid was then added to adjust the pH to about 3.5. The heated slurry was agitated for thirty minutes, and then dewatered to 20–30% dry solids. The dewatered hulls were then reslurried with fresh water and agitated for fifteen minutes at ambient temperature of about 75° F. The slurry was then dewatered again to about 20–30% dry solids, and then dried to about 10% moisture.

EXAMPLE V

The procedure of Example IV was followed generally, However, the first acid-pasteurizing treatment at 160° F. was continued for a total of sixty minutes. When the dewatered hulls were reslurried with fresh water, the reslurried hulls were again heated, this time to about 140° F., and this temperature was maintained for about thirty minutes with agitation. The products of Examples IV and V exhibited greater lightening of the hull hilum color than similar products in which hydrochloric acid was used instead of sulfuric acid. The crude fiber content of the above products was about 48% when tested using the method set forth below. The test for dietary fiber set forth below gave a result of about 76% dietary fiber. The microbial test results were at least as good as Example II. The flavor was bland and, as pointed out above, the color was lighter than Example III.

The following examples illustrate practical applications of the refined soy fiber in various food products at a level which will increase the dietary fiber intake without adversely affecting the overall organoleptic appeal of the particular food product. All of the following recipes have been used to make the respective food products, which were then compared to similar products. In each case, the added fiber product rated at least equal to its lower fiber counterpart.

EXAMPLE VI

HIGH FIBER BREAD

| | | Weight | |
|---|---|---|---|
| | | Pounds | Ounces |
| | Sponge | | |
| Part I | Bread Flour | 70 | |
| | Vital Wheat Gluten | 4 | |
| | Sodium Stearyol-2-Lactylate (Stearolac S) | | 8 |
| | Mineral Yeast Food | | 8 |
| | Shortening | 4 | |
| | Yeast | 3 | |
| | Water | 43 | |
| | Dough | | |
| Part II | Water | 57 | |
| | Refined Soy Bran | 15 | |
| | High Fructose Corn Syrup (42% Fructose) | 11 | 8 |
| Part III | Bread Flour | 30 | |
| | Soy Flour | 5 | |
| | Milk Solids Non-Fat | 5 | |
| | Salt | 2 | 8 |

Procedure:
1. Part I - Mix to a smooth dough at 75° F. Ferment 3 to 4 hrs.
2. Part II - Mix together and let hydrate at least 10 minutes.
3. Part III - Add, with sponge, to the water, soy bran, corn syrup and mix to a well developed dough at 78° to 80° F.
4. Use a good hard winter or spring wheat flour.
5. For best results, let soy bran soak overnight in the dough water, but no less than 10 minutes.
6. Fermentation time of sponge depends on quality of bread flour.
7. A good developed dough is essential.
8. Floor time of dough should be 20 to 30 minutes.
9. Give a short intermediate proof.
10. Bake in short 1 lb. pans @ 425° F.

The bread had an excellent texture and good mouthfeel, as well as a good crust color. Taste was as good as commercial high fiber brea.

EXAMPLE VII

HIGH FIBER PANCAKES

Pancakes were made using the following recipe:

| Ingredients | Percent |
|---|---|
| Flour, All Purpose | 18.8 |
| Salt | .9 |
| Sugar | 5.9 |
| Baking Powder | .9 |
| Whole Eggs | 14.7 |
| Butter, Melted | 5.3 |
| Milk | 47.2 |
| Refined Soy Bran | 6.3 |
| | 100.0 |

Pancakes made using the above recipe were compared to pancakes made with whole wheat flour, but without added fiber (soy bran). The high fiber pancakes compared favorably on all counts, including texture, taste, mouthfeel and general appearance (browning).

EXAMPLE VIII

HIGH FIBER DINNER ROLLS

| | | Weight | |
|---|---|---|---|
| | | Pounds | Ounces |
| | Sponge | | |
| Part I | Bread Flour | 70 | |
| | Vital Wheat Gluten | 4 | |
| | Mineral Yeast Food | | 8 |
| | Sodium Stearoyl-2-Lactylate | | 8 |
| | Shortening | 3 | |
| | Water | 43 | |
| | Yeast | 3 | |
| | Dough | | |
| Part II | Water | 47 | |
| | Refined Soy Bran | 15 | |
| | High Fructose Corn Syrup (42% Fructose) | 17 | |
| Part III | Whole Wheat Flour | 30 | |
| | Milk Solids Non-Fat | 2 | |
| | Soy Flour | 2 | |
| | Salt | 2 | 4 |
| | Shortening | 3 | |
| | Yeast | 1 | |

Prodecure:
1. Part I-Mix to a smooth dough at 75° F. Ferment 3 to 4 hrs. at 80° F.
2. Part II-Mix together and let soak at least 10 minutes.
3. Part III-Add, with sponge, to the soy bran soak. Mix to a well developed dough.
4. Total fermentation time depends on quality of bread flour.
5. Use a good hard winter or spring wheat flour blend.
6. Soak the soy bran overnight, if possible, but at least 10 minutes.
7. Develop dough thoroughly to 78° to 80° F.
8. Make up immediately after mixing.

High fiber dinner rolls made according to the above recipe compared favorably with dinner rolls made the same way, but without added fiber.

EXAMPLE IX

HIGH FIBER OATMEAL COOKIES

The following recipe was used to make oatmeal cookies having added fiber:

| | | % |
|---|---|---|
| Cream till smooth. | Granulated Sugar | 22.875 |
| | Corn Syrup | 7.843 |
| | Butter or Oleo | 13.077 |
| | Salt | 0.650 |
| | Milk Solids Non-Fat | 0.650 |
| | Soda (Bicarb.) | 0.327 |
| Add and cream light. | Whole Eggs | 7.189 |
| Stir in thoroughly. | Water | 3.268 |
| | Vanilla | To Suit |
| Add and mix thoroughly. | Cookie Flour | 13.077 |
| | Baking Powder | 0.327 |
| | Refined Soy Fiber (Soy Bran) | 7.843 |
| Add and mix only to thoroughly incorporate. | Quick Oatmeal | 9.804 |
| | Chopped Pecans | 13.070 |
| | | 100.000% |

Note:
1. If unsalted butter or oleo is used increase salt to 0.710%.
2. Vary granulated sugar for desired spread.
3. For more crown, let dough lay for 30 minutes before depositing.
4. Deposit with wire cut machine.
5. Bake @ 375° to 385 ° F. for 7 minutes.

The high fiber oatmeal cookies were compared to cookies made with the same recipe, but without added fiber. Texture, flavor, mouthfeel and general appearance of the high fiber cookies were as good as the conventional oatmeal cookies.

EXAMPLE X

| HIGH FIBER SESAME SEED SNACK STICKS | |
|---|---|
| Ingredients | Percent |
| Starch (substituted and inhibited) | 15.7 |
| Modified Starch | 5.3 |
| Sesame Seed | 21.2 |
| Salt | 4.1 |
| Onion Powder | 1.6 |
| Refined Soy Bran | 16.1 |
| Water | 36.0 |
| | 100.0 |

Product may be formed by processing through a low pressure former or extruder and subsequently fried at 375° F.

The high fiber sesame seed snack sticks compared favorably to sesame seed snack sticks made using the same recipe, but without added fiber.

The above examples illustrate a wide choice of baked products which are well suited to carry added dietary fiber. The particular products are just as acceptable as their lower fiber counterparts, but they supply added fiber, and less calories to the human diet.

There are a number of commercially available food fiber products, but none of those listed below in Table 1 are the same as the soy fiber (soy bran) of the subject invention. Table 1 below shows the typical analysis for six commercially available food fiber products. Sample 7 of Table 1 is the refined soybean hull fiber (soy bran) of the subject invention.

TABLE 1

Comparison of Commercial Bran (Food Fiber) Products

| Sample | Water Absorption | Percent, D.S.B. | | | | |
|---|---|---|---|---|---|---|
| | | Fiber | Protein | Fat | Ash | M&V |
| 1. Wheat Bran | | 8.71 | 17.20 | 2.71 | 7.24 | 5.70 |
| 2. Rice Bran (coarse) | | 8.53 | 22.18 | 4.18 | 12.38 | 9.85 |
| 3. Rice Bran (fine) | | 8.72 | 22.08 | 3.39 | 13.07 | 10.01 |
| 4. Corn Bran | | 12.12 | 7.78 | 2.04 | 1.06 | 6.36 |
| 5. Wheat Bran/Germ | | 10.46 | 18.87 | 5.83 | 4.54 | 8.68 |
| 6. Soy Fines | | 11.83 | 14.57 | 14.60 | 4.18 | 6.51 |
| 7. Refined Soybean Hull Fiber (Soy Bran) | 49.15 | 9.09 | 2.35 | 1.37 | 10.00 | |

"M&V = moisture and volatiles."

The above table clearly illustrates that the subject refined soybean hull product made by the method of the invention described herein contains about four times more crude fiber than the closest commercial vegetable food fiber product (Sample No. 4). Sample No. 7 of the invention is considerably lower in fat content than Sample No. 6, the only other sample which is also derived from soybean. A lower fat level makes possible increased shelf life. The only other sample which contains less fat than the subject invention is Sample No. 4, which is corn bran, but as pointed out above, Sample No. 4 only contains about one-fourth the crude fiber contained in the subject refined soy fiber.

EXAMPLE XI

Crude corn bran is obtained from that portion of wet milled corn which does not pass through a screen (Roball). The crude corn bran is then separated into a light and a heavy fraction by means of an air classifier (Carter Duo-Aspirator). The light fraction comprises about 85% by weight of the crude corn bran. The light fraction corn bran is then slurried to about 2.5–7.0% solids. The slurry pH is then adjusted to 4.0–4.5, if necessary, with $H_2SO_4$ or NaOH. The corn bran slurry is then heated to 160° F. and held at this temperature for about 45 minutes.

The slurry is then dewatered, washed, dewatered again, and then dried to about 8–12% moisture. No heat is used in the first zone of the belt dryer, and a temperature of about 230° F. is used in the second and third zones, and in the preheater. The amount of moisture remaining in the dried corn bran is determined by controlling the belt speed. This dried product is then ground and screened and packed to give a refined corn bran product. The crude fiber content is about 18% minimum, and the color of the product is neither reddish, nor yellowish, but neutral. Flavor is bland and odor is minimal. To check flavor and odor, 10 g. of product is slurried in 100 ml. distilled water. The slurry sample is then heated in a microwave oven to 160° F. The hot slurry is then tasted, and vapors sniffed to detect flavor and its odor. Typical analysis of the subject refined corn bran was as follows:

| | | Percent D.S.B. | | |
|---|---|---|---|---|
| Fiber | Protein | Fat | Ash | M&V |
| 18% min. | 6% max. | 2% max. | 1% max. | 10% max. |

The soybean hulls (raw fiber) include the seed hilum. The success obtained in the process of the subject invention using the refined soybean hulls hinges on the combination of the color change in these hilums in response to pH changes and temperature, and the best conditions of temperature to accomplish the required pasteurization of the total product.

Although it has been known that acid pH combined with heat is as effective for pasteurization, the subject invention includes the additional realization that a certain limited acid pH range is necessary to obtain the lightest possible corn bran or soy fiber product with the least amount of loss in yield. Lower temperatures during pasteurization are desirable to obtain the least possible color in the fiber product, but as the temperature is reduced, the acidity of the slurry of raw fiber must be further increased to insure adequate pasteurization in the shortest possible time.

Applicants have observed that a significant part of the color of soy fiber at alkaline or neutral pH is contributed by the seed hilums which are black at pH 7, or higher. The hilums, when in aqueous slurry at about 75° F., change color from black to deep red, and then to pink, as the pH is decreased. The lightest color was observed at a very low pH. However, the change in color proceeded out of the sequence when the slurry was heated.

For example, when the slurry of soybean hulls was held at about 160° F., and the pH was adjusted downward to about 6.2, the color of the hilum was initially black, contributing substantially to the undesirable dark color of the soybean hulls. When the pH was adjusted down to 5.5, no apparent change from black hilums was noticed, but when the pH was decreased below 5.5 to 4.5 and held for ten minutes, the hilums started to become lighter. Some were faint pink.

At a pH of 3.5, the hilums were observed to be light in color, with no pink at all. When the pH was reduced further to 2.5, the pink color of the hilums reappeared after about fifteen minutes at this lower pH. Further lowering of the pH causes the hilums to turn to even a deeper red color.

It was therefore concluded that the most desirable combination of conditions for best results of color and pasteurization should be with moderate heat, about 160° F., and with a pH no lower than about 3.5, and up to no more than about 5. The resulting processed soybean fiber product is effectively pasteurized, has the desired light color, bland flavor and there is a minimal loss in yield, which occurs when pH is decreased any lower than 3.5.

As was done with Examples VI through X above, refined corn bran made according to Example XI above was also tested in various food products as set forth below. The food products were rated good to excellent by taste panels.

EXAMPLE XII

Corn Bran High Fiber Bread

The same recipe and procedure was used to make corn bran (Example XI) bread as set forth above in Example VI. The only difference was the replacement of 15 pounds refined soy bran with 15 pounds refined corn bran. The resulting corn bran high fiber bread had excellent texture and good mouthfeel and good crust color. Taste was rated comparable to commercial high fiber bread.

EXAMPLE XIII

Corn Bran High Fiber Pancakes

The same recipe was used as is set forth above in Example VII, except 6.3% refined soy bran was replaced with 6.3% refined corn bran (of Example XI). Comparison of the above corn bran pancakes was made to pancakes made with whole wheat flour, but without any added fiber. The corn bran high fiber pancakes compared favorably on all counts, including texture, taste, mouthfeel and general appearance (browning).

EXAMPLE XIV

Corn Bran High Fiber Dinner Rolls

The recipe and procedure set forth in EXAMPLE VIII above was used, except 15 pounds of refined corn bran (Example XI) was used instead of 15 pounds of refined soy bran. The corn bran dinner rolls were rated good to excellent in every criteria measured, comparing favorably to dinner rolls made without added fiber. The corn bran dinner rolls rated superior for color.

EXAMPLE XV

The refined corn bran (fiber) made according to Example XI was substituted for the refined soy bran in the same recipe as set forth about in Example IX for:

High Fiber Oatmeal Cookies

About 7.8% refined corn bran was used. The resulting high fiber oatmeal cookies were compared to cookies made with the same recipe, but without added fiber. The texture, flavor, mouthfeel and general appearance of the corn bran high fiber cookies were as good or better than the conventional oatmeal cookies without added fiber.

EXAMPLE XVI

High Fiber Sesame Seed Snack Sticks

The Example XI corn bran was used to replace refined soy bran in the recipe and procedure of Example X with most favorable results. The above snack sticks compared favorably in every respect to snack sticks made with the same recipe, but without added fiber.

EXAMPLE XVII

Corn Bran Granola Bars

The subject refined corn bran (Example XI) was also used in the following recipe:

| Ingredients | Percent |
| --- | --- |
| 1. Rolled Oats | 17.3 |
| Wheat germ with honey | 14.3 |
| Corn bran | 6.0 |
| Coconut | 8.9 |
| Raisins | 7.5 |
| Almonds | 9.1 |
| 2. Honey | 8.3 |
| Brown sugar | 7.6 |
| Corn syrup, 36 D.E. | 7.5 |
| Corn oil | 4.5 |
| Water | 7.5 |
| Vanilla | 1.5 |
| | 100.0 |

Procedure:
1. Dry blend No. 1.
2. Add No. 2.
3. Bake at 325° F. for 25 minutes.
4. Cut and cool.

The above granola bars compared favorably with granola bars made without added corn bran (fiber).

Additional products can be made with the subject corn bran. An excellent corn bran breakfast cereal, for example can be made using about 33% corn bran. The improved, pasteurized corn and soy bran (fiber) products of the invention are highly suitable for all the above food products and many more.

TEST PROCEDURES

The test procedures set forth below were used to determine the values recorded above.

CRUDE FIBER

"Crude fiber" is the loss on ignition of dried residue remaining after digestion of a measured sample with 1.25% (0.255 N) sulfuric acid ($H_2SO_4$), and 1.25% (0.313 N) sodium hydroxide (NaOH) solutions. The test is outlined generally in A.O.A.C Tenth Edition, pages 332, 333 and 334.

The sample is ground to about 100 mesh, and 2 g. is extracted with petroleum ether to remove oil residue (if present). The 2 g. sample is then added to 200 ml. of boiling sulfuric acid and boiled briskly for thirty minutes. An asbestos "blank" is subjected to the same acid treatment using 2 g. of asbestos which has been acid washed and ignited.

The boiled samples are then filtered and washed with boiling water. The residues of the samples are then boiled in 1.25 NaOH for thirty minutes. The samples are then filtered and washed with boiling 1.25% $H_2SO_4$, water and 3A alcohol. The residues of the samples are then dried for two hours at 135° C., then cooled and weighed. After recording weights, the samples are ignited and burned for thirty minutes at 600° C., and the residues are reweighed.

$$\% \text{ fiber} = \frac{(\text{loss in weight on ignition} - \text{loss in weight of asbestos blank}) \times 100}{\text{sample weight (2g.)}}$$

PROTEIN DETERMINATION

The standard Kjeldahl method can be used to determine nitrogen (N) content of the samples. The percentage protein can then be determined by multiplying the percent N found by a factor of 6.25 for most protein-containing materials (soy bran, corn bran, etc.). A factor of 5.7 is used for wheat bran products because some of the amino acids found in wheat bran contain a larger proportion of nitrogen. See A.O.C.S. Official Testing Procedure Ba 4-38.

MOISTURE (Oven Method)

The moisture in a 10 g. sample is removed by heating the sample in an oven at 135° C. for two hours. After heating, the sample is cooled in a dessicator and weighed. A forced draft oven, controlled for uniform heating with ±2° C. of the specified temperture, is used.

$$\text{Percent Moisture in Sample} = \frac{\text{loss in weight} \times 100}{\text{dry weight of sample}}$$

WATER HOLDING CAPACITY

Mix 10 g. sample and boiling distilled water to give desired water:sample ratio (1:1, 1.5:1, 2:1, 25:1, etc.). Let the mixture stand for thirty minutes to insure complete hydration. Stir the mixture and add 10 g. to a 15 ml. centrifuge tube. Centrifuge for one hour at 3000 rpm in an International Clinical Centrifuge Model CL.

The water holding capacity (WHC) of the sample is defined as the amount of water needed for complete hydration. The WHC, therefore is the g. water/g. sample of the highest water:sample ratio for which no supernatant appears after centrifugation.

ODOR

The sample is shaken in a closed container. The container is opened and immediately smelled by an experienced person having a good sense of smell. The odor description and intensity are recorded. Results reported may range from "none", "bland", "beany", "rancid" odor, and the like.

FLAVOR EVALUATION

Slurry 5 grams of sample in 95 ml. of bottled nursery water. Place slurry in Waring Blender and blend at high speed for one minute. Transfer to a clean 250 ml. beaker. Slurry is not ready to taste. Stir with spoon to get solids in suspension just prior to tasting. Rate flavor on a scale of 1 to 10. Scores of at least 6 are acceptable.

Typical comments by flavor test panel members included: "bland", "bitter", "beany", "toasted", and the like. The panel members also have had experience in tasting soy fiber products, and other soybean products as a basis for making the graded comparison of the subject test. The subject product normally scores higher than 6, and should be bland without any "beany", "bitter", or other taste.

COLOR

A Gardner Colorimeter may be used, following the manufacturer's instruction manual. This instrument is manufactured by Gardner Laboratory Inc., Bethesda, Md.

SCREEN SIZE

A series of U.S. Standard Sieve circular screens are assembled in a unit with the coarsest screen on top and placed in a RO-TAP Shaker. A 100 g. sample of the material to be screened is placed on top of the stacked screens and shaken for five minutes. The amount of material "retained on" or "passing through" a particular mesh screen is measured and recorded.

MICROBIAL TESTS

The following tests are taken from the designated chapters of:
FDA—Bacterial Analytical Manual for Foods—Federal Food and Drug Administration, Bureau of Foods, Division of Microbiology, printed by The Association of Analytical Chemists, Box 540, Washington, D.C., July 1976.
A. Standard Plate Count—Mesophilic—Chapter IV
B. Salmonella—Chapter VI
C. Coliforms—Chapter V
D. Yeasts and Molds—Chapter XVII
E. Staphylococcus—Chapter XI

DIETARY FIBER

The "crude" fiber test set forth above actually destroys part of the fiber in the test sample, and does not measure all available "dietary" fiber, which includes cellulose, hemi-cellulose and lignin. "Dietary" fiber, which does include all cellulose, hemicellulose, and lignin, is measured according to the "Van Soest" method which has been published in Agricultural Handbood Number 379, H. K. Goering and P. J. Van Soest, *Forage Fiber Analyses*, Agricultural Research Service, USDA, December 1970 pages 1-20.

What is claimed is:

1. In a method of making pasteurized food fiber from crude fiber-containing vegetable seed hulls, the steps comprising:
   (a) mixing water and said vegetable hulls to form an aqueous slurry;
   (b) maintaining the pH of said aqueous slurry in the range of 2.5–5.0;
   (c) heating said slurry to a temperature of about 155° F.–180° F. for 15–60 minutes to acid-pasteurize said seed hulls;
   (d) dewatering said aqueous slurry of seed hulls;
   (e) washing said dewatered seed hulls with fresh water to further refine said seed hulls;
   (f) dewatering the washed seed hulls; and
   (g) drying said dewatered seed hulls to obtain refined, acid-pasteurized vegetable fiber suitable for human consumption.

2. In a method of making pasteurized, light-colored food fiber from crude fiber-containing vegetable seed hulls having dark-colored hilums, the steps comprising:
   (a) mixing water and said vegetable seed hulls to form an aqueous slurry;

(b) adjusting the pH of said aqueous slurry to 2.5–5.0;
(c) heating said slurry to a temperature of about 155° F.–180+ F. for 15–60 minutes to acid-pasteurize said seed hulls and substantially lighten the dark-colored hilums of said seed hulls;
(d) dewatering said aqueous slurry of seed hulls;
(e) washing said dewatered seed hulls with fresh water to increase the fiber content of the seed hulls by decreasing the content of non-fiber materials therein;
(f) dewatering the washed seed hulls; and
(g) drying said dewatered seed hulls to obtain an acid-pasteurized vegetable fiber suitable for human consumption which is lighter in overall color than the crude fiber-containing seed hulls.

3. In a method of pasteurizing soybean hulls having dark-colored seed hilums, the steps comprising:
(a) preparing an aqueous slurry containing about 3–10% dry solids of soybean hulls;
(b) maintaining said slurry at a pH in the range of 2.5–5.0 and at a temperature of about 155° F.–180° F. for 15–60 minutes to acid-pasteurize said soybean hulls, and to change the seed hilums of said soybean hulls from dark-colored to light-colored;
(c) dewatering said slurry of soybean hulls;
(d) washing said dewatered soybean hulls with fresh water to increase the fiber content of the seed hulls by decreasing the content of non-fiber materials therein;
(e) dewatering the washed soybean hulls; and
(f) drying said dewatered soybean hulls to obtain light-colored pasteurized soybean hulls having a total bacteria standard plate count less than 50,000 max./gram.

4. A substantially dry, pasteurized food fiber derived from crude soybean hulls having dark-colored hilums resulting from the method of claim 3, containing no more than 2% by weight fat, less than 15% protein, and a minimum of 45% crude fiber, said food fiber material having no detectible level of Salmonella, Coliforms and coagulase positive Staphylococci bacteria, said fiber having a water-holding capacity of about 3.0 to 4.5 grams water per gram of said fiber sample tested.

5. The method of claim 1, in which the seed hulls are selected from the group consisting of soybean hulls, corn hulls, rice hulls, wheat hulls, rye hulls, barley hulls, oat hulls and pea hulls.

6. The method of claim 2, in which the pH is adjusted to about 3.5 during heating.

7. The method of claim 3, in which the pH is maintained to about 3.5 during heating.

8. The method of claim 2, in which the heating temperature is maintained at about 160° F.–170° F. during pasteurizing.

9. The method of claim 3, in which the slurry of soybean hulls is maintained at a temperature of about 160° F.–170° F. during pasteurizing.

10. The method of claim 3, in which the pH is maintained at about 4.0–4.5 with concentrated sulfuric acid.

11. The method of claim 2, in which the pH is adjusted with an acid selected from the group consisting of hydrochloric, sulfuric, tartaric, acetic, ascorbic, citric, itaconic, phosphoric and fumaric acids.

12. The method of claim 3, in which the soybean hulls are initially slurried in water at a level of about 5–6% solids, said soybean hulls then being washed as a slurry of about 3–4% solids with added fresh water after the first dewatering step.

13. The method of claim 2, in which the washing of said dewatered seed hulls with fresh water is conducted at a temperature below 155° F. but higher than about 130° F.

14. The method of claim 3, in which the fresh water wash is conducted at a temperature of about 130° F.–155° F. for about 30 minutes.

15. The acid-pasteurized, light-colored soybean hulls resulting from the method of claim 14.

16. The method of claim 1, in which the crude fiber containing vegetable seed hulls comprise corn bran, and the pH of the aqueous slurry is maintained in the range of 3.5–5.0.

17. The method of claim 16, in which the solids level of said aqueous slurry of corn bran is in the range of about 2.5–10%.

18. The method of claim 1, in which the vegetable seed hulls comprise corn bran.

* * * * *

UNITED STATES PATENT AND TRADEMARK OFFICE
CERTIFICATE OF CORRECTION

PATENT NO. : 4,181,747
DATED : January 1, 1980
INVENTOR(S) : Hunter L. Kickle et al.

It is certified that error appears in the above-identified patent and that said Letters Patent are hereby corrected as shown below:

Column 1, line 42; for "diety" read —dietary—
Column 3, line 9; for "slimly" read —slimy—

Column 5, line 45; for "brea" read —bread—
Column 13, line 3; for "180+F." read —180°F.—

Signed and Sealed this

First Day of July 1980

[SEAL]

*Attest:*

SIDNEY A. DIAMOND

*Attesting Officer*     *Commissioner of Patents and Trademarks*